Aug. 11, 1953   E. K. METTLER ET AL   2,648,534
ANALYTICAL BALANCE
Filed Aug. 14, 1951   2 Sheets-Sheet 1

Inventors:
Erhard Karl Mettler
Johann Meier
By: Pierce, Scheffler & Parker
Attorneys.

Patented Aug. 11, 1953

2,648,534

UNITED STATES PATENT OFFICE 2,648,534

ANALYTICAL BALANCE

Erhard Karl Mettler, Zollikon (Zurich), and Johann Meier, Kusnacht (Zurich), Switzerland Application August 14, 1951, Serial No. 241,774
In Switzerland April 28, 1951

8 Claims. (Cl. 265—54)

This invention relates to an analytical balance comprising a balance beam having a central knife edge and at least on one of its arms a terminal knife edge from which is suspended a pan carrier supporting a balance pan.

Objects of the invention are to provide an analytical balance of the type stated in which a suspension member is seated upon a terminal knife edge of the balance beam, a pan carrier extends above and below said suspension member and is pivotally supported on the suspension member by means of a supporting linkage, a balance pan is disposed on the pan carrier above said suspension member and above said supporting linkage, and a stabilising weight is mounted on said pan carrier below the supporting linkage and below the suspension member in order to obtain a free and stable suspension of the pen carrier including the balance pan upon said suspension member. Objects are to provide, in an analytical balance of the type stated, a suspension member fulcrumed on a terminal knife edge of the balance beam, a pan carrier extending above and below said suspension member and pivotally supported thereupon by means of a supporting linkage, a stabilising weight mounted on the lower part of said pan carrier, a case enclosing said movable parts of the balance, an opening in the upper surface of said case and a balance pan freely projecting through said opening and disposed in a removable manner upon centering means provided on the upper end of said pan carrier. A further object is to provide an analytical balance of the kind outlined and including a suspension member seatable on a terminal knife edge of the balance beam, a pan carrier extending above and below said suspension member and pivotally supported thereupon by means of a supporting linkage disposed above said suspension member, a balance pan disposed on the upper end of the pan carrier, a stabilising weight mounted on the lower end of the pan carrier, an auxiliary carrier pivotally supported on said suspension member by means of an additional linkage which has a horizontally disposed pivotal axis at right angles to the direction of said terminal knife edge of the balance beam, and a counterweight mounted on said auxiliary carrier below said terminal knife edge in order to obtain a stable equilibrium of the suspension member fulcrumed on the terminal knife edge of the balance beam.

These and other objects and the advantages of the invention will best be understood from the following description of a specific embodiment when read in connection with the accompanying drawing, wherein like reference characters indicate like parts throughout the figures and in which.

Figure 1:
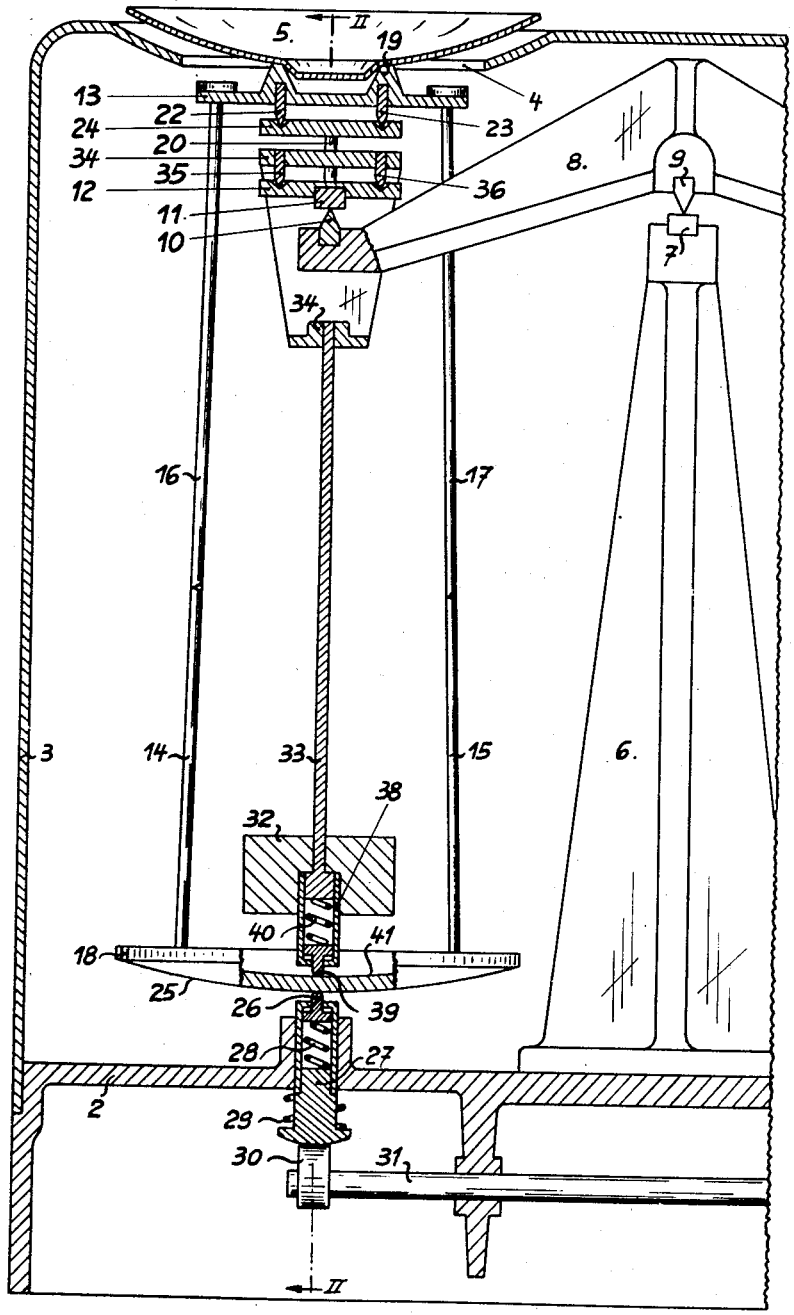
Figure 1 is a sectional front elevation of an analytical balance embodying the novel features of our invention, parts thereof being broken away to better illustrate the construction, the optical devices for reading the swings of the beam, the beam releasing mechanism and the stirrup arrestment means being omitted.

Referring to the drawings, let the reference character 2 indicate the base of the balance having instrument leveling means (not shown) and supporting a case 3 such as is usually provided to protect the operating mechanism. The upper surface of the case 3 has a recessed opening 4 through which the balance pan 5 can freely project. The supporting column 6 is disposed within the case 3 and has an inset bearing plate 7 on which the balance beam 8 is fulcrumed by means of its central knife edge 9. In Fig. 1 only the left hand arm of the balance beam 8 with its terminal knife edge 10 is shown, on which latter the bearing plate 11 is seatably supported. The bearing plate 11 is secured in a suspension member 12. The pan carrier consists of a rectangular plate-shaped part 13 at the corners of which rods 14, 15, 16 and 17 are rigidly secure. The rods 14 to 17 carry at their lower ends and rigidly mounted thereon a disc-shaped stabilising weight 18. The upper part 13 of the pan carrier has an annular rib 19 on which the balance pan 5 is removably supported.

Figure 2:
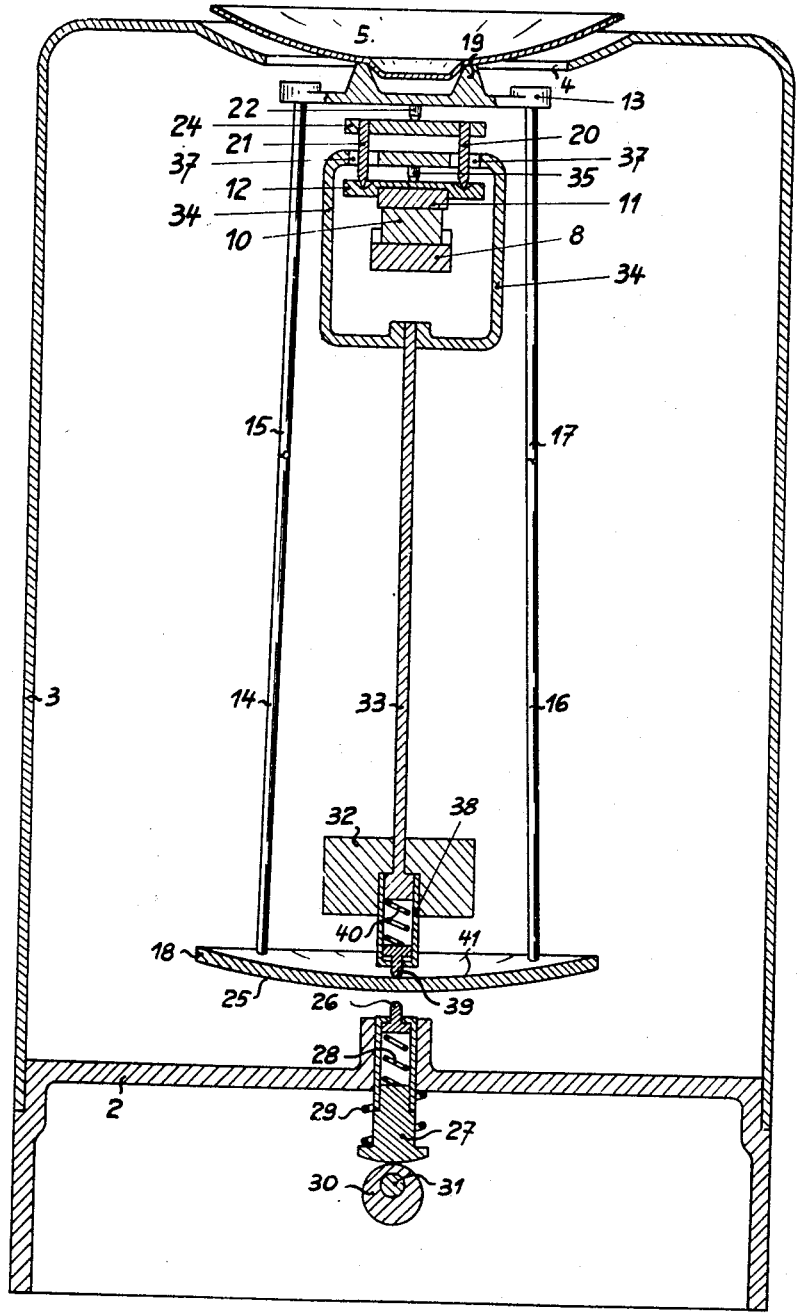
Figure 2 is a section seen from the right on the line II—II of Fig. 1.

Between the part 13 of the pan carrier and the suspension member 12, a supporting linkage is disposed above the member 12 which is formed as a cross-linkage and has an intermediate link part 24 in which the pins 20, 21 having sharpened lower ends are secured (Fig. 2). These pins pivotally support the intermediate part 24 in recessed guide-ways, which are disposed on the suspension member 12. The intermediate part 24 has on its upper side, additional to the pins 20, 21, crosswise disposed, recessed guide-ways for a further pair of pins 22, 23, which are secured in the part 13 with their sharpened ends disposed downwardly (Fig. 1). The pan carrier 13 to 17, provided at the top with the balance pan 5 and at its lower end with the stabilising weight 18, is consequently freely hung on the suspension member 12. If the member 12 be regarded as fixed, and the balance pan 5 be loaded eccentrically, then the pan carrier 13 to 17, and consequently also the balance pan 5 and the stabilising weight 18, will turn about the cross linkage 20 to 24 until a new equilibrium has been taken up. In order to damp oscillations which the pan carrier might perform on the cross linkage 20 to 24, the disc-shaped stabilising weight has a lower arcuate surface 25. The damping of the oscillations is effected by a friction pin 26 under spring pressure from below, which is mounted to be axially displaceable in the spring housing 27 and is lightly pressed upwards by the weak spring 28. The spring housing 27 is mounted to be axially displaceable in the base 2 and is pressed from below on to the eccentric 30 by means of a strong compression spring 29. The eccentric 30 is secured on an operating shaft 31 revolvable in the base 2 which, by means of a handle or knob (not shown) can be turned in order to put the friction pin 26 into or out of action. In Fig. 1, in that position of the eccentric 30 is shown, in which the friction pin 26 touches the arcuate surface 25 of the stabilising weight 18 and damps swingings thereof. In Fig. 2, the eccentric 30, on the other hand, is shown in its lowest position, in which the friction pin is withdrawn downwardly, and consequently the damping mechanism is set out of action.

As the cross linkage 20 to 24 for the suspension of the pan carrier 13 to 17 is preferably disposed above the inset bearing plate 11, means must be provided to convert the otherwise unstable equilibrium of the suspension member 12 fulcrumed on the terminal knife edge 10 into a stable one. For this purpose, a counterweight 32 is provided which is mounted on the lower end of an auxiliary carrier consisting of a supporting rod 33 and a yoke 34. This auxiliary carrier is pivotally supported on the suspension member 12 by means of an additional linkage comprising two pins 35 and 36 which are mounted on the upper part of the yoke 34, the sharpened ends of which pins are directed downwardly and engage in recessed guide-ways disposed on the suspension member 12. The auxiliary carrier can swing with the counterweight 32, therefore, only about one axis which is disposed at right angles to the direction of the terminal knife edge 10 (Fig. 1) when the suspension member 12 is held fast. Openings 37 (Fig. 2) in the yoke 34 prevent the yoke 34 striking the pins 20 and 21 of the cross linkage 20 to 24. If the suspension member 12, on the other hand, freely pivots on the terminal knife edge 10 of the balance beam 8, then the suspension member 12 as also the auxiliary carrier 33 and 34 and its counterweight 32 may equally swing about the terminal knife edge 10. In order to damp such oscillations, a spring sleeve 38 is disposed beneath the rod 33 in which a friction pin 39 is axially displaceable. A weak spring 40 constantly presses this friction pin 39 on the upper arcuate surface 41 of the stabilising weight 18. When all oscillations have died away, then the inset bearing plate 11 will lie on the terminal knife edge 10 always in a horizontal position, and this position is independent of the variable inclination which the pan carrier 13 to 17 may have due to an eccentric loading of the balance pan 5. An eccentric loading of the pan 5 can therefore only cause a corresponding turning of the pan carrier 13 to 17 on the cross linkage 20 to 24 whereas the position of the suspension member 12 pivoted on the terminal knife edge 10 remains constant. Should an eccentric loading of the balance pan 5 exceed a predetermined amount, then the balance pan 5 tips about the rib support 19 and comes to lie on the edge of the recessed opening 4 of the case 3, so that the pins 20 to 23 of the cross linkage are prevented from leaving the predetermined guide-ways on the intermediate link part 24 and on the suspension member 12.

As may be seen from Figs. 1 and 2, no extra balance beams and no additional articulated guide-links with further knife edges and self-centering bearings are necessary, in order to compensate for the effect of an eccentric loading of the balance pan, as has been necessary with balances of conventional construction having a balance pan above the balance beam. However, this advantage of the analytical balance described is secured at the expense of a somewhat heavier loading of the knife edges 9 and 10 of the balance beam, which is created by the stabilising weight 18 and the counterweight 32. As the centre of motion of the cross linkage 20 to 24 lies above the suspension member 12, the lever arm, by which a torque is exercised on the pan carrier 13 to 17 when the balance pan 5 is eccentrically loaded, is much smaller than the lever arm by which the stabilising weight 18 creates a countertorque. Therefore, the weight of the stabilising weight 18 need only have a value which is a fraction of the maximum weight which is to be laid on the balance pan 5. Similar considerations apply to the counterweight 32. The additional loading of the knife edges 9 and 10 created by the stabilising weight 18 and the counterweight 32 is therefore immaterial. The sensitivity and accuracy of the analytical balance described is substantially equal to that of corresponding analytical balances of known form which have balance pans disposed beneath the balance beam. The analytical balance described has a considerable scope of practical utility and allows a rapid operation of the balance, as the placing of the article to be weighed and its removal from the balance pan is not restricted by any window or stirrup.

The balance construction hereinbefore described, it will be understood, is intended to include auxiliary parts, such, for instance, as a manually operable arrestment by which the balance beam 8 can be lifted from the fulcrum support 7 and the suspension member 12 from the terminal knife edge 10. These parts are conventional and are not shown in Figs. 1 and 2 for the sake of clearness. Further, the right hand arm of the balance beam 8, not shown in Fig. 1, can be symmetrical with the left hand arm, a second pan being hung on the terminal knife edge in a similar manner as that shown in Fig. 1 for the left hand balance pan 5. The case 3 can then obviously be provided with two openings 4, through which the two balance pans extend out of the case 3. Modifications which may occur to those familiar with the art fall within the spirit and scope of the invention as set forth in the following claims.

We claim:

1. An analytical balance comprising a balance beam having a central knife edge and on one of its arms a terminal knife edge, a suspension member seated on said terminal knife edge, a pan carrier extending above and below said suspension member, a supporting linkage disposed above said suspension member and pivotally supporting said pan carrier on said suspension member, a balance pan disposed on said pan carrier above said supporting linkage, a stabilising weight mounted on said pan carrier below said suspension member, an auxiliary carrier pivotally supported on said suspension member and extending below said terminal knife edge, and a counterweight mounted on said auxiliary carrier below said terminal knife edge in order to obtain a stable equilibrium of said suspension member seated on the terminal knife edge of the balance beam.

2. The invention as recited in claim 1, wherein said auxiliary carrier is pivotally supported on said suspension member by means of an additional linkage which has a horizontally disposed pivotal axis at right angles to the direction of said terminal knife edge of the balance beam.

3. The invention as recited in claim 2, wherein said additional linkage comprises a pair of sharpened pins mounted on said auxiliary carrier and engaging in recessed guide-ways provided on said suspension member.

4. The invention as recited in claim 1, wherein one of said two carriers has a horizontally extending disc-shaped damping member having an arcuate surface and the other of said carriers has friction means permanently pressed against said arcuate surface in order to extinguish oscillations which may arise between said two carriers.

5. An analytical balance comprising a balance beam having a central knife edge and on one of its arms a terminal knife edge, a suspension member seated on said terminal knife edge, a pan carrier extending above and below said suspension member, a supporting linkage pivotally supporting said pan carrier on said suspension member, a stabilising weight mounted on said pan carrier below said supporting linkage and below said suspension member, a case and cooperating base forming an enclosure for said movable parts of the balance, said case having an opening in the upper surface thereof and disposed above said suspension member and above said supporting linkage, and a balance pan freely projecting through said opening and disposed on the upper end of said pan carrier.

6. The invention as recited in claim 5, wherein said stabilising weight is a disc-shaped member extending parallel to said balance pan and mounted on the lower end of said pan carrier above the base.

7. The invention as recited in claim 6, wherein said disc-shaped stabilising weight has a lower arcuate surface, a friction pin mounted in said base beneath said stabilising weight and for vertical adjustment with respect thereto, and manually operable means on said base for moving said vertically displaceable friction pin into engagement with the lower arcuate surface of said stabilising weight in order to extinguish oscillations which said pan carrier may perform.

8. An analytical balance comprising a balance beam having a central knife edge and on one of its arms a terminal knife edge, a suspension member seated on said terminal knife edge, a pan carrier extending above and below said suspension member, a supporting cross linkage pivotally supporting said pan carrier on said suspension member and having two horizontally disposed pivotal axes at right angles to each other, a balance pan disposed on the upper end of said pan carrier above said terminal knife edge and above said supporting cross linkage, a stabilising weight mounted on said pan carrier below said supporting cross linkage, an auxiliary carrier pivotally supported on said suspension member by means of an additional linkage having a horizontally disposed pivotal axis at right angles to the direction of said terminal knife edge, said auxiliary carrier extending below said terminal knife edge and below said additional linkage, and a counterweight mounted on the lower end of said auxiliary carrier.

ERHARD KARL METTLER.
JOHANN MEIER.

References Cited in the file of this patent
UNITED STATES PATENTS

| Number | Name | Date |
|---|---|---|
| 110,696 | Truex | Jan. 3, 1871 |
| 998,066 | Zimmerman | July 18, 1911 |
| 1,002,784 | Talbot | Sept. 5, 1911 |
| 1,169,929 | Conway | Feb. 1, 1916 |
| 1,257,547 | Templeton | Feb. 26, 1918 |
| 1,764,649 | Schaper | June 17, 1930 |
| 1,954,205 | Hem | Apr. 10, 1934 |
| 2,119,106 | Johnson | May 31, 1938 |

FOREIGN PATENTS

| Number | Country | Date |
|---|---|---|
| 39,655 | Netherlands | July 15, 1936 |